(12) United States Patent
Hurst-Hiller et al.

(10) Patent No.: US 7,725,463 B2
(45) Date of Patent: May 25, 2010

(54) SYSTEM AND METHOD FOR GENERATING NORMALIZED RELEVANCE MEASURE FOR ANALYSIS OF SEARCH RESULTS

(75) Inventors: Oliver Hurst-Hiller, Seattle, WA (US); Laurent Chavet, Kirkland, WA (US); Brett D. Brewer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 10/879,002

(22) Filed: Jun. 30, 2004

(65) Prior Publication Data

US 2006/0004891 A1   Jan. 5, 2006

(51) Int. Cl.
    *G06F 17/30* (2006.01)
(52) U.S. Cl. .............................. 707/723; 707/999.003; 707/770; 707/748
(58) Field of Classification Search ................. 707/1, 707/3
    See application file for complete search history.

(56) References Cited

U.S. PATENT DOCUMENTS

| | | | | |
|---|---|---|---|---|
| 5,940,821 A * | 8/1999 | Wical | | 707/3 |
| 6,397,212 B1 * | 5/2002 | Biffar | | 707/5 |
| 6,654,742 B1 * | 11/2003 | Kobayashi et al. | | 707/7 |
| 6,766,320 B1 * | 7/2004 | Wang et al. | | 707/5 |
| 6,944,609 B2 * | 9/2005 | Witbrock | | 707/3 |
| 6,954,755 B2 * | 10/2005 | Reisman | | 707/10 |
| 7,028,026 B1 * | 4/2006 | Yang et al. | | 707/3 |
| 7,062,488 B1 * | 6/2006 | Reisman | | 707/8 |
| 7,188,106 B2 * | 3/2007 | Dwork et al. | | 707/5 |
| 7,257,577 B2 * | 8/2007 | Fagin et al. | | 707/7 |
| 7,283,997 B1 * | 10/2007 | Howard et al. | | 707/5 |
| 7,610,306 B2 * | 10/2009 | Lin et al. | | 707/104.1 |
| 2002/0169765 A1 * | 11/2002 | Saltz | | 707/3 |
| 2003/0172075 A1 * | 9/2003 | Reisman | | 707/10 |

(Continued)

OTHER PUBLICATIONS

Manmatha, R. and Sever, H., A Formal Approach to Score Normalization for Meta-search, HLT'02, Mar. 26, 2002, available online at: http:IIciir.cs.umass.edulpubfileslir-242.pdf.*

(Continued)

*Primary Examiner*—Neveen Abel Jalil
*Assistant Examiner*—Christyann R Pulliam
(74) *Attorney, Agent, or Firm*—Shook, Hardy & Bacon LLP (57) ABSTRACT

A system and related techniques permit a search service operator to access a variety of disparate relevance measures, and integrate those measures into idealized or unified data sets. A search service operator may employ self-learning networks to generate relevance rankings of Web site hits in response to user queries or searches, such as Boolean text or other searches. To improve the accuracy and quality of the rankings of results, the service provider may accept as inputs relevance measures created from query logs, from human-annotated search records, from independent commercial or other search sites, or from other sources and feed those measures to a normalization engine. That engine may normalize those relevance ratings to a common scale, such as quintiles, percentages or other scales or levels. The provider may then use that idealized or normalized combined measure to train the search algorithms or heuristics to arrive at more accurate results.

33 Claims, 6 Drawing Sheets

U.S. PATENT DOCUMENTS

2003/0212663 A1* 11/2003 Leno et al. .................. 707/3
2003/0220913 A1* 11/2003 Doganata et al. ............ 707/3
2004/0024752 A1*  2/2004 Manber et al. ............... 707/3
2005/0080771 A1*  4/2005 Fish ............................ 707/3

OTHER PUBLICATIONS

Yao, Y.Y., Measuring Retrieval Effectiveness Based on User Preference of Documents, Journal of the American Society for Information Science, 46(2): 133-145 (1995).*

* cited by examiner

FIG. 1

| query | rank | result |
|---|---|---|
| Microsoft | 1 | www.microsoft.com |
| | 2 | www.microsoft.com/office |
| | 3 | www.msn.com |
| | 4 | www.microsoft.com/windows |
| | 5 | www.microsoft.com/presspass |
| ... | ... | ... |

| Rating | Weighting | Variance from avg. CTR |
|---|---|---|
| Perfect | 14 | +10X |
| Excellent | 7 | +2X |
| Good | 3 | 0 |
| Fair | 1 | -2X |
| Bad | -4 | -5X |

SYSTEM AND METHOD FOR GENERATING NORMALIZED RELEVANCE MEASURE FOR ANALYSIS OF SEARCH RESULTS

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computer-based search technology, and more particularly to a system and techniques for accepting a variety of divergent measures of search result relevance, and normalizing those disparate inputs to one normalized metric.

BACKGROUND OF THE INVENTION

The increasing demand for Web-based search engines and services has helped fuel a corresponding demand for ever more accurate and cogent search results. A number of Web search services exist which permit a user to type in desired search terms and in response be presented with a ranked list of Web sites containing material which is potentially relevant to that search. As the number of available Web pages has grown into the billions, the necessity for an accurate assessment of the relatedness or relevance of Web site results to a user's search terms has grown even more acute.

There are a variety of known techniques for assessing the relevance of search results to a user's query. Those include the examination of search or query logs, for instance logs stored on a server, to examine search terms, the resulting list of ranked results and the user's ultimate click-through or other selection choices from amongst that list. The results which users most frequently choose to access may be empirically presumed to be the results which they as consumers of the information judged to be most relevant to their query.

Results may also in cases be evaluated by teams of human search analysts, who may review search terms and results and formulate their own assessment of the relatedness of search hits to that query. Human-annotated results may require more time to complete and therefore may sometimes not represent a practical large-scale or real-time rating scheme. However, because of the ability of human reviewers to reach judgments about relevance with greater flexibility than many algorithmic or heuristic approaches, those relevance measures may be considered equally or more likely to be accurate than other metrics when available.

Similarly, a company deploying a search service may perform evaluations of the quality of its search relevance algorithms by consulting the result rankings for the same or similar searches produced by other public or commercial Web search engines or sites. A significant divergence between the relevance ratings generated by two separate search services may indicate that the evaluation methods of one or both engines may be inaccurate or incomplete.

A company deploying a search service may desire to make the quality and accuracy of its search results as high as possible, to attract more users, deliver greater satisfaction to those users, and to make the search experience as efficient as possible. Service providers in that position may therefore wish to consult the relevance measures generate by various diverse sources such as query logs, human-annotated ratings, other search service ratings and other sources, in order to assess and improve the accuracy of their own engines. For example, providers may wish to assimilate those diverse relevance ratings to train the self-learning or other heuristics or algorithms employed in their search infrastructure, to adjust weights and other functions to generate more accurate and satisfactory results.

However, no mechanism exists to access and assimilate the relevance ratings of disparate sources to generate a higher-level, composite rating or "ideal set" of relevance rating data. This is in part because diverse sources of relevance ratings may each generate or encode a ranking of relevance in a different scale than the others, making direct comparisons, averaging or other aggregate processing impossible. Other problems in search technology exist.

SUMMARY OF THE INVENTION

The invention overcoming these and other problems in the art relates in one regard to a system and method for generating a normalized relevance measure for analysis of search results, in which a search service may assimilate a set of input feeds from diverse sources of relevance metrics or ratings. Those diverse sources may include for example query logs drawn from server or other records of user queries and their associated results, human-annotated relevance ratings, independent search service ratings and other relevance sources, ratings or channels. In embodiments, the set of disparate relevance metrics may be communicated to a normalization engine configured to receive, scale, modify or otherwise process those inputs into an integrated or normalized relevance metric or measure. The set of relevance metrics may for example be normalized by converting them to a common scale in the normalization engine. The contribution of each of the relevance metrics so converted to a common scale may in embodiments be further adjusted by the normalization engine, depending for example on factors such as the type of the relevance metric, a confidence measure reflecting confidence in the relevance metric, a frequency of the relevance metric, or other factors. In embodiments, the normalized relevance output may be broken down into ordinal categories reflecting varying degrees of search result relevance, or may be scaled to a common numeric scale, such as percentage confidence, or be expressed in other rating scales or representations. The operator of a search service may therefore in one regard use the normalized relevance output to, for example, train their self-learning or other search heuristics, algorithms or other processes to refine the accuracy and quality of their search results.

DETAILED DESCRIPTION OF EMBODIMENTS

Figure 1:
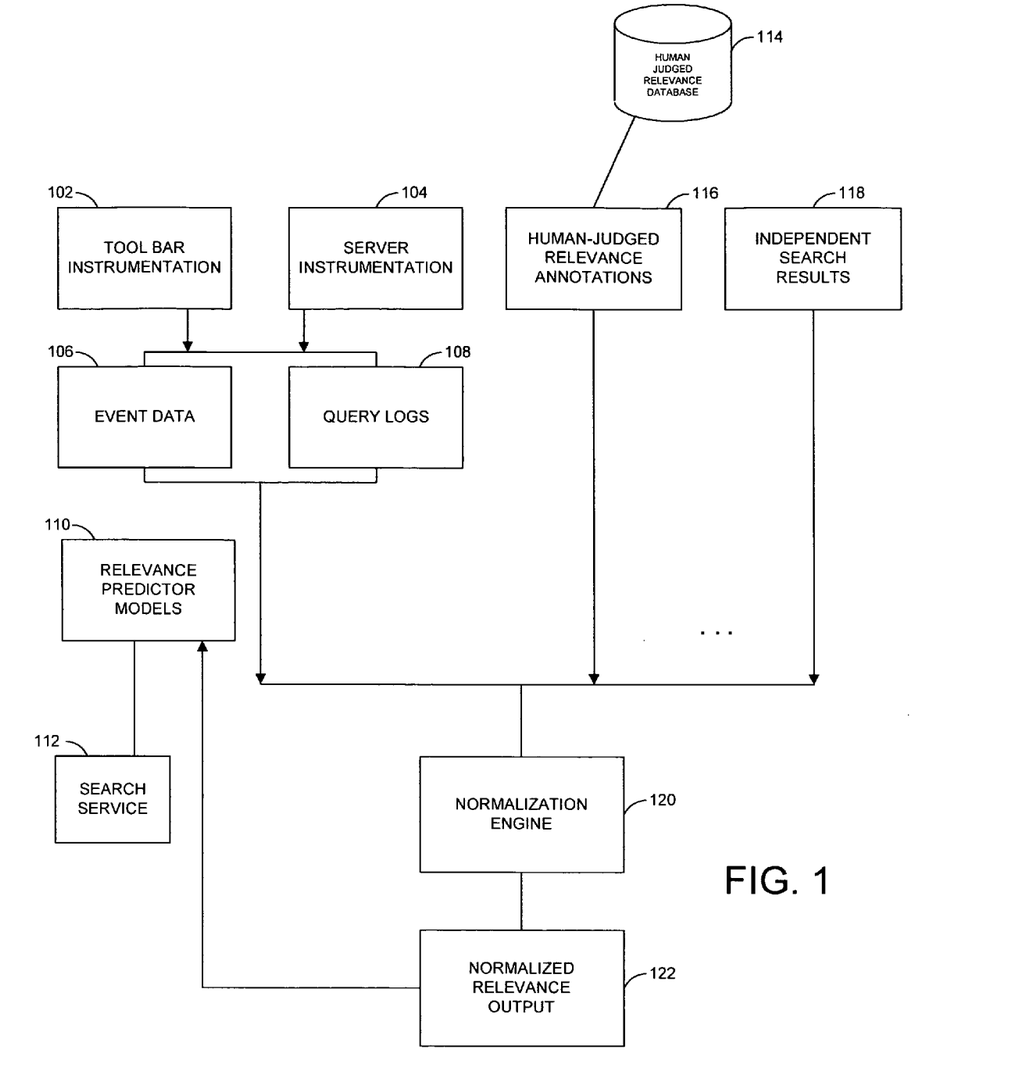
FIG. 1 illustrates an environment in which a system and method for generating a normalized relevance measure for analysis of search results may operate, according to embodiments of the invention.

FIG. 1 illustrates an environment in which a system and method for generating a normalized relevance measure for analysis of search results may operate, according to embodiments of the invention. As illustrated in that figure, a search service 112 such as a Web-based search service may incorporate or interface to a set of relevance predictor models 110, to receive, analyze and respond to user queries and searches. For example, the search service 112 may present a search dialogue on a public Internet site, through which users may type in or otherwise input search terms or data, such as words or other expressions, to search for Web content matching their request. According to embodiments of the invention in one regard, the search service 112 may retrieve Web sites, addresses or other search hits which are candidates for presentation to the user, for instance by matching the search terms or other expressions to an index of Web sites, or through other techniques.

When a set of search results are located for the user's query, the search service 112 may order those results for the user to browse and select. In embodiments, the search results may be presented to the user in the form of a list of activatable links so that the user may click or otherwise select Web sites or other locations whose content they wish to view. Other result formats are possible. According to embodiments of the invention in one regard, the provider or operator of the search service 112 may wish to present the user with the most relevant or related results based on the search terms or other input at the top of that list, for instance in an ordinal ranking according to their predicted relevance to the user's search terms and intended search goals.

The relevance predictor models 110 may in embodiments support and perform the task of evaluating the search results, and rate or rank them for presentation to the user. According to embodiments of the invention in one regard, the relevance predictor models 110 may be, include or interface to self-learning networks such as neural networks or support vector models which may be trained to identify relevant search results to a user query. Those networks may employ, for instance, a feedback loop whereby varying weights are applied to various relevance factors, the value of which weights are then adjusted in an iterative process to drive the relevance metrics or results to increased accuracy based on comparisons to other relevance data.

To increase the accuracy with which the relevance predictor models 110 may identify results, according to embodiments of the invention the relevance predictor models 110 may be provided with data sets reflecting external relevance evaluations, against which the assessments of the relevance predictor models 110 may be compared. Feedback loops and other mechanisms may then be applied to cause the self-learning networks of the relevance predictor models 110 to adjust their weightings and other processing, to generate more accurate and better quality search results for the user.

Toward that purpose, according to embodiments of the invention the relevance predictor models 110 may be provided with an integrated relevance measure derived from a set of diverse rating sources, which may in general separately generate search ratings, rankings, taxonomies or other assessments in different, nonconforming or inconsistent formats or scales. The diversity of the sources which may be assimilated and used to verify the relevance judgments trained into the relevance predictor models 110 may help to ensure that the evaluated relevance of given search results is derived from as broad an empirical or predictive base as possible. Again, according to embodiments of the invention in one regard those relevance sources may be integrated for combined use even when those sources are not configured to use the same relevance scales, ratings, structures, contexts or formats.

More particularly, and as likewise illustrated in FIG. 1, according to embodiments of the invention a variety of relevance ratings may be incorporated in or accessed by the evaluation resources of the search service 112. As shown, in implementations tool bar instrumentation 102, such as control logic built into or operating with a Web browser, as well as server instrumentation 104 may communicate with event data 106 and query logs 108, to access historical search data and provide one source of relevance ratings or related data. More specifically, server instrumentation 104 may capture details regarding the search activities of users, such as inputted search terms, and store those details to query logs 108, along with associated search results generated by those queries. Similarly, toolbar instrumentation 102 may capture details regarding user behaviors, such as the occurrence of a click through or other activation to view a link in a set of search results or others, and store those activities to event data 106.

Figure 2:
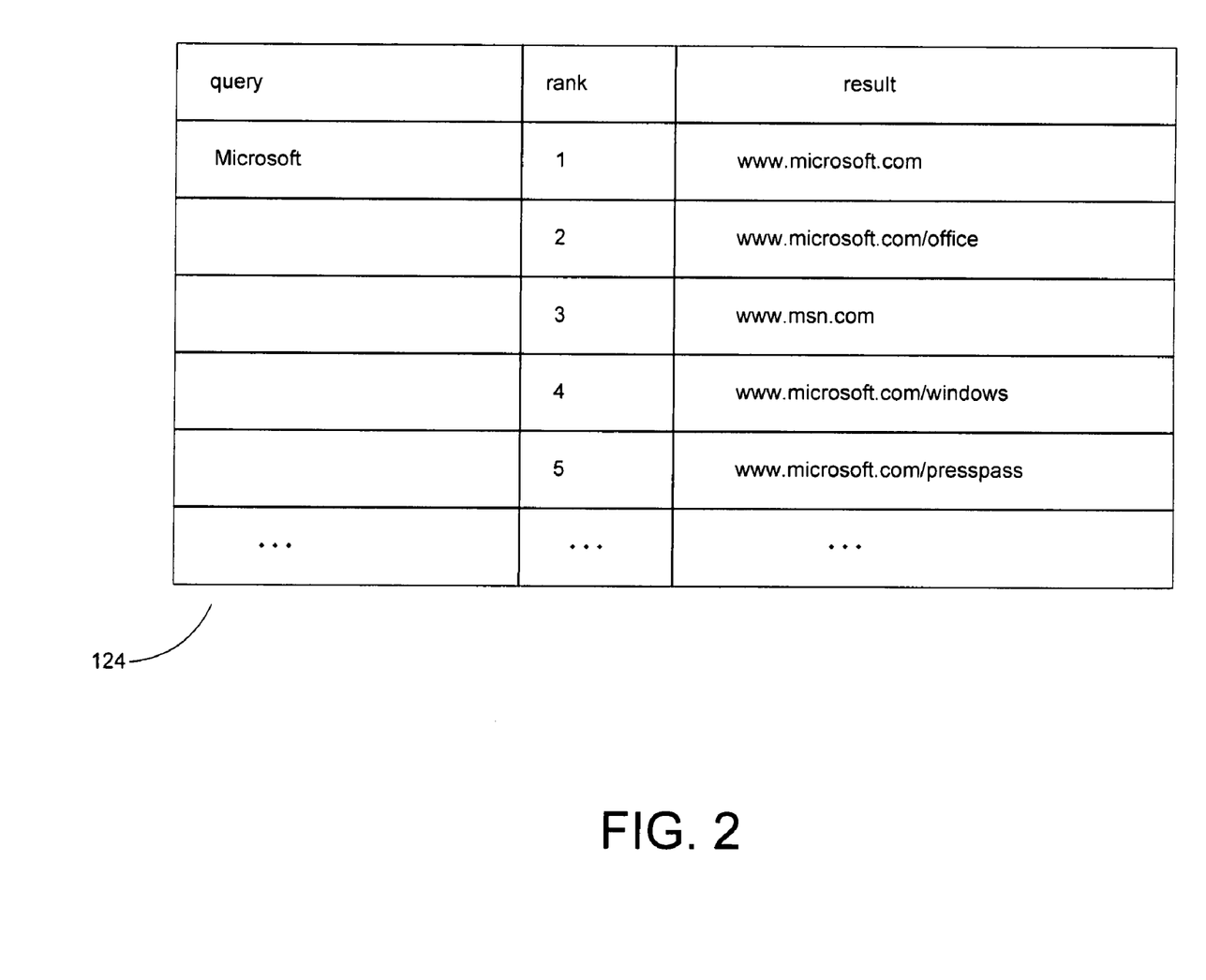
FIG. 2 illustrates a set of example search results, according to an embodiment of the invention.

The event data 106 along with query logs 108 may be communicated to the relevance predictor models 110 to estimate or evaluate the relevance of the results viewed by the user. For example as shown in FIG. 2, a set of search results 124 may be presented to a user who has inputted a search terms such as "Microsoft". The search results 124 as shown may include a list of Web links or other addresses, locations or resources which the user may access in response to the results. The user may then select, click or otherwise activate links or other elements of the search results 124 to investigate Web sites or other content which may be related to their search terms or expression.

Figure 3:
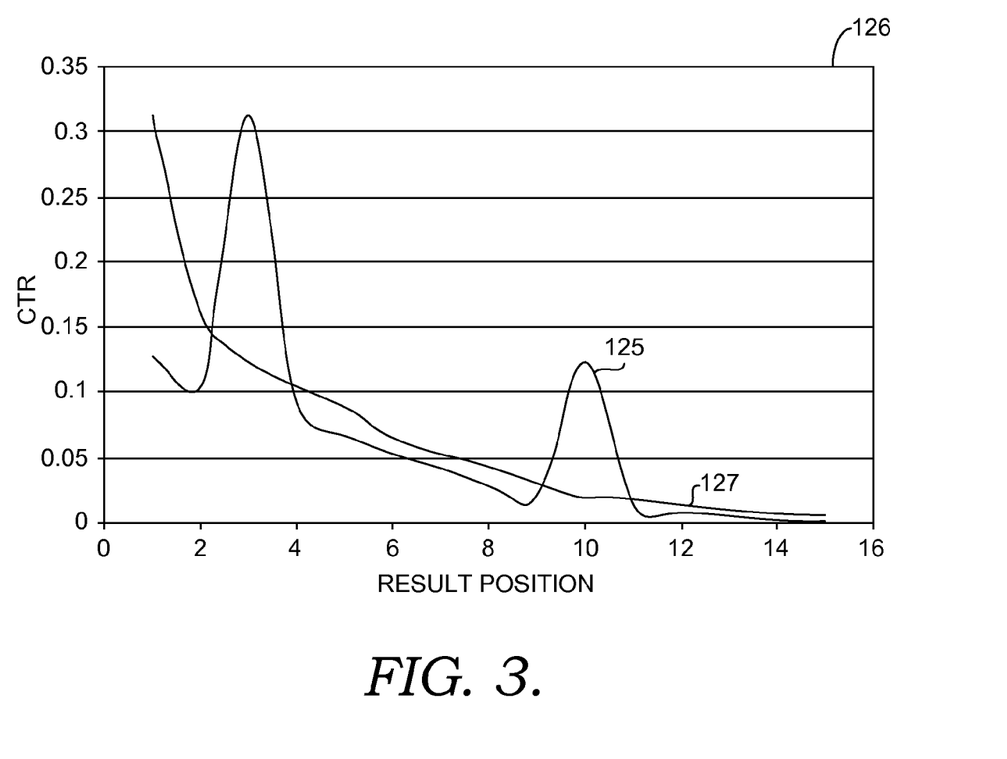
FIG. 3 illustrates a result preference graph, according to embodiments of the invention.

As for example illustrated in FIG. 3, according to embodiments of the invention in one regard, while the search results 124 (FIG. 2) may be presented to the user by the search service 112 (FIG. 1) in an order determined by the relevance predictor models 110 (FIG. 1), in instances as shown in result preference graph 126 (FIG. 3) the user may elect to view links from within those results in a different order than that presented. This may imply that a reordering of results and adjustment of the relevance predictor models 110 (FIG. 1) may be warranted. The deviation illustrated in FIG. 3 between the user's empirically selected results 125, such as those reflected in event data 106 and query logs 108 of FIG. 1, and result rankings 127 presented via relevance predictor models 110 may be captured and communicated to normalization engine 120 (FIG. 1), along with other data. The variance between the result rankings 127 and actual user's empirically selected results 125 may then form an input to the relevance predictor models 110 to update the training of those models or algorithms.

Returning to FIG. 1, besides relevance information captured via event data 106, query logs 108 and related resources, the normalization engine 120 may likewise receive relevance information from further data sources, including as again illustrated in FIG. 1 human-judged relevance annotations 116. The human-judged relevance annotations 116 may be derived from various sources involving human review of search results and judgments on their relevance, including teams of human search analysts who may for example review user requests of a search service in real time or after the fact. In embodiments human-judged relevance annotations 116 may be stored to or extracted from a human-judged relevance database 114, or other data stores or resources. Human-judged relevance annotations 116 may likewise include explicit user feedback, such as for example comments or ratings queried from users at the point their search experience is complete, from Web user groups or other forums or channels through which human responses may be obtained. The human-judged relevance annotations 116 may also be communicated to normalization engine 120, in one regard for assimilation into an aggregate or combined relevance measure, as indicated in FIG. 1.

Normalization engine 120 may likewise receive a further input of relevance information via independent search results 118, which may be or include, for instance, the result rankings or other data derived from other public or commercial search engines or services when performing a search on the same or similar search terms. Other diverse or disparate sources of relevance ratings may be used to supply relevance measures or metrics to normalization engine 120.

Normalization engine 120 may thus receive as inputs the relevance ratings derived from query logs 108 and related sources, from human-judged relevance annotations 116, independent search results 118 and other sources or channels. According to the invention in one regard, the normalization engine 120 may receive, process and integrate those inputs into a normalized relevance output 122. The normalization engine 120 may receive the diverse data sets to generate such an aggregate, composite or "idealized" relevance data set. The normalization engine 120 may in one regard scale or adjust the relevance rating, metric, position, taxonomy or other relevance expressions received from the diverse sources to a common or normalized scale or other representation.

Figure 4:
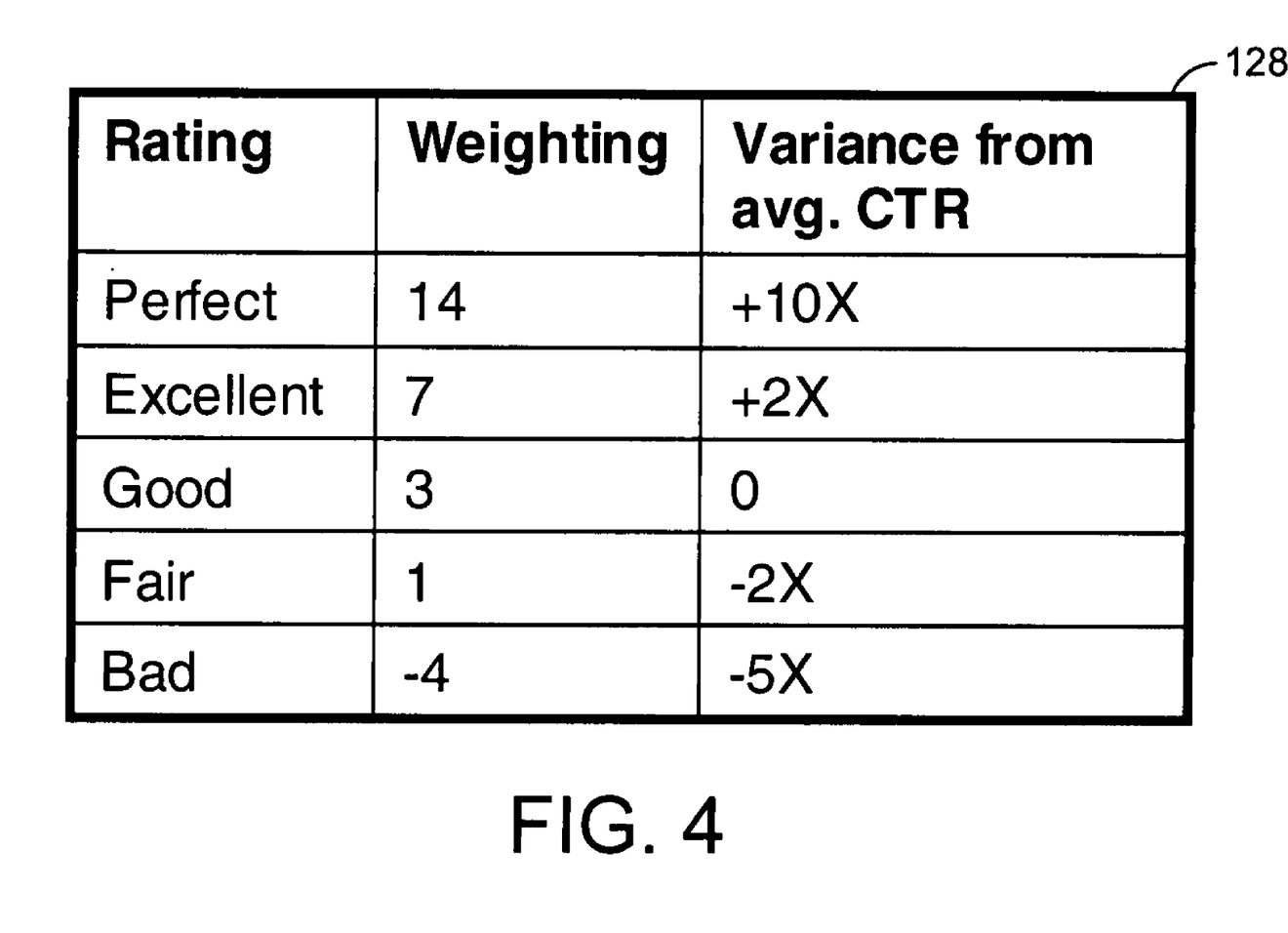
FIG. 4 illustrates a set of result ratings levels, according to embodiments of the invention.
Figure 5:
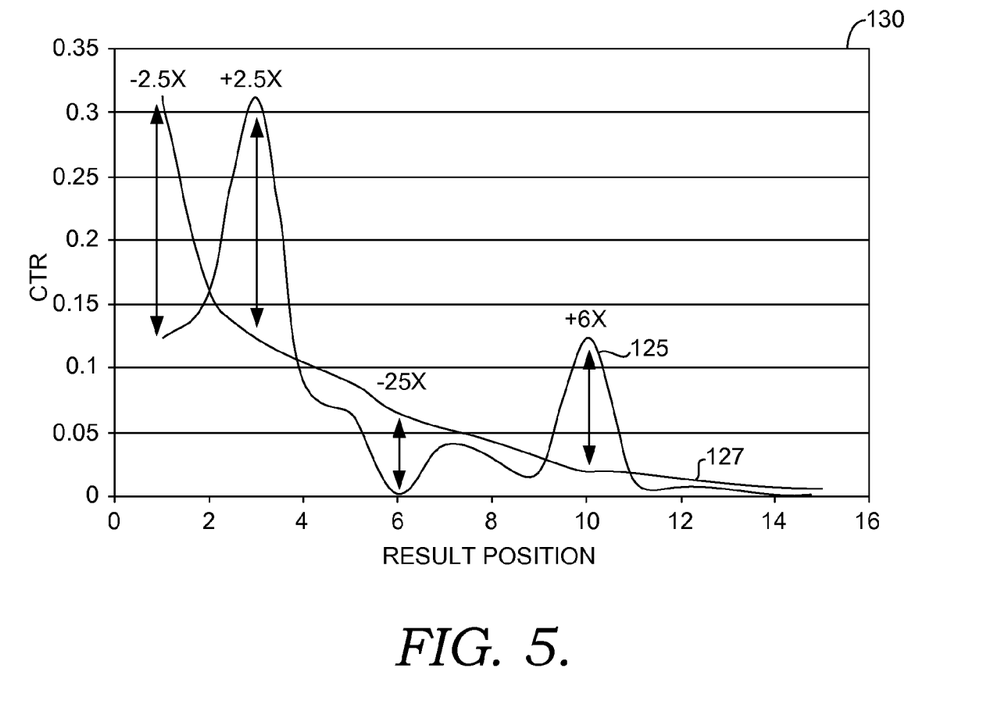
FIG. 5 illustrates a result variance graph, according to embodiments of the invention.

According to embodiments of the invention in one regard, the normalization engine 120 may, for example, examine the degree of deviation or variance between the set of ordinal search results generated by any one or more of the disparate relevance sources, and the user's empirical result selections 125 (in the manner as again for instance illustrated in FIG. 3). For further example as illustrated in FIG. 4, the ratings of individual results with a set of ordinal search results may then for instance be assigned to a one of a set of hierarchical or other result ratings levels 128. As illustrated in that figure, ratings for which the user's click-through rate or other selection behavior exceed their ordinal ranking by at least a factor of 2 may, for example, be grouped together and qualitatively labeled "excellent", while those which users select at a rate at least 5 times less than their ordinal ranking would suggested may be grouped together and labeled or categorized as "bad". FIG. 5 illustrates a result variance graph 130 showing the derivation of such variance between result rankings 127 and user's empirical result selection 125, as measured by user click-through rate or other activity. Other rating schemes, levels, thresholds, categories, ratings and indicators are possible which may be applied to each of the diverse sources of relevance data.

Returning to FIG. 1, however, it may be noted that according to embodiments of the invention, the relevance inputs from the separately generated, independently scaled sources may each be converted to a common or normalized scale, categorization or metric via normalization engine 120 or other resources.

According to embodiments of the invention in another regard, the set of normalized relevance ratings derived from the set of ratings sources may likewise be further processed or adjusted once converted to a common scale or dimension. For instance, the normalization engine 120 may in cases not simply add the normalized relevance ratings in equal fashion, to derive a simple average of relevance ratings. In embodiments the normalization engine 120 may instead may apply further weights or other functions or adjustments to the contribution each source may make to the ultimate normalized relevance output 122. For example, in embodiments the human-judged relevance annotations 116 may be considered more valid, predictive or trustworthy than other sources, depending for instance on search application or the stage of training of relevance predictor models 110.

Thus in such embodiments, the contribution of the human-judged relevance annotations 116 may be accorded a greater weight than other inputs, for example 75% of weighting, in such cases. The remaining sources may be accorded a weighting for instance of 25%. When applied to the normalized sources, the weightings may be determined, for example, based on a variety of factors such as the type of the source or the frequency with which the source processes queries or updates its relevance ratings. The weighting or other adjustment may also be similarly determined or calculated using an associated confidence rating for given sources or source types, which may for example be automatically or manually set by systems administrators or others, or be based on other factors or criteria.

Once normalization engine 120 has converted any one or more of the available relevance sources derived from query logs 108, human-judged relevance annotations 116, independent search results 118 and other sources to a common scale or dimension, and weighted or otherwise adjusted those inputs as appropriate, the normalization engine 120 may generate a normalized relevance output 122 which summarizes or integrates all supplied relevance data. The normalized relevance output 122 may be or include, for example, composite relevance categorizations or ratings generated from those sources, to achieve a broad metric of relatedness to apply to search results. Normalized relevance output 122 may in other embodiments be expressed in other formats, such as percentage confidence levels, statistical expressions such as standard deviations, or in other forms, fields, data structures, expressions or objects.

Once computed, the normalized relevance output 122 may be communicated to the relevance predictor models 110, for instance to train those models based on that normalized, integrated or composite relevance measure. The relevance predictor models 110 may then train internal self-learning networks and other resources, for example to adjust weights and employ other mechanisms to refine their relevance identification capability, incorporating the empirical learning and other results derived from the array of relevance sources. The accuracy and quality of the search results and user experience delivered by search service 112 may thus be enhanced.

Figure 6:
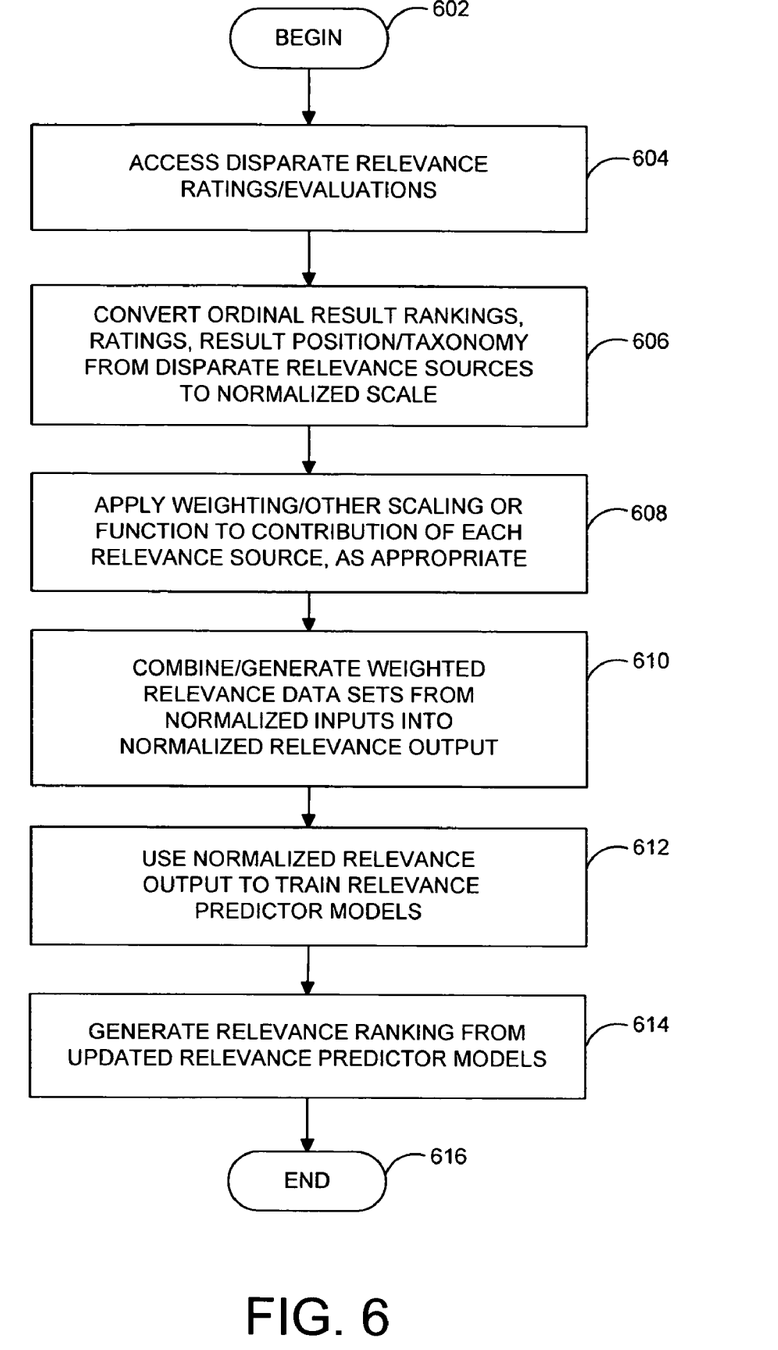
FIG. 6 illustrates relevance normalization processing, according to embodiments of the invention.

FIG. 6 illustrates overall relevance normalization processing, according to embodiments of the invention in one regard. In step 602, processing may begin. In step 604, a set of disparate relevance ratings or evaluations may be accessed or inputted, for example including data derived from server or other query logs 108, from human-judged relevance annotations 116 or other human-generated measures, from independent search results 118 or other engines or services, or from other sources or channels, as shown in FIG. 1. In step 606, the set of diverse ordinal result rankings, ratings, result position or taxonomies or other relevance ratings may each be converted to a normalized metric, scale, function or other measure or representation, for instance in graded levels, confidence percentages, variance ratings or other representations.

In step 608, the contribution or weight of each relevance measure so scaled to the ultimate composite or normalized rating may be adjusted, as appropriate, depending on factors such as the type of the relevance metrics, a confidence measure which may be associated with each relevance metric, a frequency of each relevance measure, or other factors. For instance, human-judged relevance ratings may be accorded a higher confidence measure or given a greater contribution percentage than independent search service results. This may for example occur in one regard when the training of relevance predictor models 110 is at a comparatively early stage, or at other times.

In step 610, the set of normalized rating inputs, including contributions which may be scaled or adjusted as appropriate, may be combined into an integrated or idealized normalized relevance output 122 (FIG. 1). In step 612 of FIG. 6, the normalized relevance output 122 (FIG. 1) may be used to train or update the relevance predictor models 110 (FIG. 1), which may be, include or interface self-learning networks such as neural networks, support vector machines, or other algorithms, heuristics, automata or machines. In embodiments the training or updating using the normalized relevance output 122 (FIG. 1) may be done, for example, by adjusting weights within feedback networks, or via other techniques.

In step 614, relevance ratings or rankings generated by the relevance predictor models 110 (FIG. 1) or other resources may be applied to generate results for user searches or queries, for instance via a Web-based search service or others. Returning to FIG. 6, in step 616, processing may repeat, return to a prior processing point, jump to a further processing point or end.

The foregoing description of the invention is illustrative, and modifications in configuration and implementation will occur to persons skilled in the art. For instance, while the invention has generally been described in terms of one normalization engine 120 which assimilates various relevance measures as inputs, in embodiments multiple normalization engines or logic may be used, in distributed fashion.

Similarly, while the invention has in embodiments generally been described as operating to enhance relevance processing and training for Internet or Web-based search services, in embodiments search engines or services hosted on other networks, such as local area networks (LANs), wireless or telecommunications networks, may use or employ embodiments of the invention. Other hardware, software or other resources described as singular may in embodiments be distributed, and similarly in embodiments resources described as distributed may be combined. Further, while search results have generally been described as being presented in ranked lists of Web or other links, in implementations the results whose relevance may be analyzed according to embodiments of the invention may include results generated, coded or presented in other formats or contexts, such as selector wheels, slideshows or other formats or structures. The scope of the invention is accordingly intended to be limited only by the following claims.

We claim:

1. A system comprising one or more computer storage media embodying one or more executable software components for generating a normalized relevance output for use in search result analysis, the one or more software components comprising:
    a normalization engine to receive a set of independently scaled relevance metrics and a user's empirical result selections,
    wherein at least a portion of the set of independently scaled relevance metrics comprises independently scaled relevance metrics originating from a plurality of disparate sources and being incapable of direct comparison,
    wherein the independently scaled relevance metrics include human input feeds that are unanalyzed by a search engine, ordinal search results generated by one or more disparate relevance sources, and server-captured user behaviors,
    to convert each of the independently scaled relevance metrics to one or more normalized metrics, wherein converting comprises:
        (a) accessing the set of ordinal search results from the one or more disparate relevance sources;
        (b) determining a degree of deviation upon comparing ratings of individual results within the set of ordinal search results against the user's empirical result selections derived from query logs and event data that capture search activities of the user; and
        (c) assigning each of the individual results of the set of ordinal search results a hierarchical rating level based on the degree of deviation, wherein the greater the degree of deviation, the greater the hierarchical rating level, and
    to rank the one or more normalized metrics based on the hierarchical rating level, such that the normalized relevance output is generated.

2. The system according to claim 1, wherein the set of independently scaled relevance metrics comprises at least one of relevance data derived from query logs, human-annotated relevance data and relevance ratings derived from a search service.

3. The system according to claim 2, wherein the human-annotated relevance data comprises at least one of human live site feedback, human search analyst relevance data, human explicit feedback data from the search service, and user feedback data.

4. The system according to claim 2, wherein the set of independently scaled relevance metrics comprises at least relevance data derived from query logs, and the relevance data derived from query logs comprises relevance data derived from user selection data.

5. The system according to claim 4, wherein the relevance data derived from user selection data comprises user click-through data selecting from a search results list.

6. The system according to claim 1, wherein ranking the one or more normalized metrics comprises adjusting a contribution of each of the one or more normalized metrics to the normalized relevance output based on at least one of relevance metric type, a confidence measure associated with each of the independently scaled relevance metrics, and a frequency of each of the independently scaled relevance metrics.

7. The system according to claim 1, wherein the one or more normalized metrics are qualitatively labeled.

8. The system according to claim 1, wherein ranking the one or more normalized metrics comprises at least one of applying a scaling weight and applying a scaling function.

9. A method for generating a normalized relevance output for use in search result analysis, comprising:
    receiving a set of independently scaled relevance metrics and a user's empirical result selections, wherein at least a portion of the set of independently scaled relevance metrics comprises independently scaled relevance metrics originating from a plurality of disparate sources, wherein the independently scaled relevance metrics include human input feeds, unanalyzed by a search engine, and being incapable of direct comparison;
    converting each of the set of independently scaled relevance metrics to one or more normalized metrics;
    aggregating the one or more normalized metrics utilizing the hierarchical rating level, wherein the aggregation of the one or more normalized metrics comprises assigning a weight to the one or more normalized metrics based on each of the following:
(a) a type of each of the set of independently scaled relevance metrics from which the one or more normalized metrics are derived, respectively;
(b) a confidence measure associated with each of the set of independently scaled relevance metrics, wherein the human input feeds are accorded a greater weight than others in the set of independently scaled relevance metrics; and
(c) a frequency of each of the independently scaled relevance metrics;

generating the normalized relevance output from the aggregated one or more normalized metrics, wherein the normalized relevance output includes standard deviations that summarize the hierarchical rating level associated with the one or more normalized metrics, and wherein the standard deviations are derived according to a method comprising:
(a) accessing a set of ordinal search results from the one or more disparate relevance sources;
(b) determining standard-deviations upon comparing ratings of individual results within the set of ordinal search results against a user's empirical result selections derived from query logs and event data that capture search activities of the user; and
(c) assigning each of the individual results of the set of ordinal search results a hierarchical rating level based on the degree of deviation, wherein the greater the degree of deviation, the greater the hierarchical rating level; and refining a relevance identification capability of a relevance predictor model, for ranking search results, by training the relevance predictor model with the normalized relevance output.

10. The method according to claim 9, wherein the set of independently scaled relevance metrics comprises at least one of relevance data derived from query logs, human-annotated relevance data and relevance ratings derived from a search service.

11. The method according to claim 10, wherein the human-annotated relevance data comprises at least one of human live site feedback, human search analyst relevance data, human explicit feedback data from the search service, and user group feedback data.

12. The method according to claim 10, wherein the set of independently scaled relevance metrics comprises at least relevance data derived from query logs, and the relevance data derived from query logs comprises relevance data derived from user selection data.

13. The method according to claim 12, wherein the relevance data derived from user selection data comprises user click-through data selecting from a search results list.

14. The method according to claim 9, wherein the one or more normalized metrics are qualitatively labeled.

15. The method according to claim 9, aggregation of the one or more normalized metrics comprises at least one of applying a scaling weight and applying a scaling function.

16. One or more computer storage media having computer-executable instructions embodied thereon that, when executed, perform a method for generating a normalized relevance output, the method comprising:
receiving a set of independently scaled relevance metrics and a user's empirical result selections, wherein at least a portion of the set of independently scaled relevance metrics comprises a user's empirical result selections and independently scaled relevance metrics originating from a plurality of disparate sources, wherein the independently scaled relevance metrics include human input feeds, unanalyzed by a search engine, and being incapable of direct comparison, and a set of ordinal search results captured by a relevance predictor model;

converting each of the independently scaled relevance metrics to one or more normalized metrics, wherein converting comprises:
(a) accessing the set of ordinal search results from the relevance predictor model;
(b) determining a degree of deviation upon comparing ratings of individual results within the set of ordinal search results against the user's empirical result selections derived from query logs and event data that capture search activities of the user, and
(c) assigning each of the individual results of the set of ordinal search results a hierarchical rating level based on the degree of deviation, wherein the greater the degree of deviation, the greater the hierarchical rating level;

ranking the one or more normalized metrics based on the hierarchical rating level; and generating the normalized relevance output from the ranked one or more normalized metrics.

17. The computer storage media of claim 16, wherein the set of independently scaled relevance metrics comprises at least one of relevance data derived from query logs, human-annotated relevance data and relevance ratings derived from a search service.

18. The computer storage media of claim 17, wherein the human-annotated relevance data comprises at least one of human live site feedback, human search analyst relevance data, human explicit feedback data from the search service, and user group feedback data.

19. The computer storage media of claim 17, wherein the set of independently scaled relevance metrics comprises at least relevance data derived from query logs, and the relevance data derived from query logs comprises relevance data derived from user selection data.

20. The computer storage media of claim 19, wherein the relevance data derived from user selection data comprises user click-through data selecting from a search results list.

21. The normalized relevance output according to computer storage media of claim 16, wherein ranking the one or more normalized metrics comprises adjusting a contribution of each of the one or more normalized metrics to the normalized relevance output based on at least one of relevance metric type, a confidence measure associated with each of the independently scaled relevance metrics, and a frequency of each of the independently scaled relevance metrics.

22. The computer storage media of claim 16, wherein the one or more normalized metrics are qualitatively labeled.

23. The computer storage media of claim 16, wherein ranking the one or more normalized metrics comprises at least one of applying a scaling weight and applying a scaling function.

24. One or more computer storage media having computer-executable instructions embodied thereon that, when executed, perform a method for training a relevance predictor model, the method comprising:
receiving a set of independently scaled relevance metrics and a user's empirical result selections, wherein at least a portion of the set of independently scaled relevance metrics comprises a user's empirical result selections, and independently scaled relevance metrics originating from a plurality of disparate sources, wherein the independently scaled relevance metrics are human input feeds, unanalyzed by a search engine, and being incapable of direct comparison, and a set of ordinal search results captured by a relevance predictor model;

converting each of the independently scaled relevance metrics to one or more normalized metrics, wherein converting comprises:
  (a) accessing the set of ordinal search results from the relevance predictor model;
  (b) determining a degree of deviation upon comparing ratings of individual results within the set of ordinal search results against the user's empirical result selections derived from query logs and event data that capture search activities of the user, and
  (c) assigning each of the individual results of the set of ordinal search results a hierarchical rating level based on the degree of deviation, wherein the greater the degree of deviation, the greater the hierarchical rating level;

ranking the one or more normalized metrics based on the hierarchical rating level;

generating a normalized relevance output from the ranked one or more normalized metrics; and training the relevance predictor model using the normalized relevance output.

25. The computer storage media of claim 24, wherein the set of independently scaled relevance metrics comprises at least one of relevance data derived from query logs, human-annotated relevance data and relevance ratings derived from a search service.

26. The computer storage media of to claim 25, wherein the human-annotated relevance data comprises at least one of human live site feedback, human search analyst relevance data, human explicit feedback data from the search service, and user group feedback data.

27. The computer storage media of claim 25, wherein the set of independently scaled relevance metrics comprises at least relevance data derived from query logs, and the relevance data derived from query logs comprises relevance data derived from user selection data.

28. The computer storage media of claim 27, wherein the relevance data derived from user selection data comprises user click-through data selecting from a search results list.

29. The computer storage media of claim 24, wherein ranking the one or more normalized metrics comprises adjusting the contribution of each of the one or more normalized metrics to the normalized relevance output based on at least one of relevance metric type, a confidence measure associated with each of the independently scaled relevance metrics, and a frequency of each of the independently scaled relevance metrics.

30. The computer storage media of claim 24, wherein the one or more normalized metrics are qualitatively labeled.

31. The computer storage media of claim 24, wherein ranking the one or more normalized metrics comprises at least one of applying a scaling weight and applying a scaling function.

32. The computer storage media of claim 24, wherein the relevance predictor model comprises a self-learning network.

33. The computer storage media of claim 32, wherein the self-learning network comprises at least one of a neural network and a support vector model.

* * * * *